United States Patent [19]

Beals et al.

[11] 3,885,448

[45] May 27, 1975

[54] CONTROL LEVER AND LINKAGE SYSTEM

[75] Inventors: Duane E. Beals, Decatur; William W. Blake, Wyoming; Paul C. Rosenberger, Decatur, all of Ill.

[73] Assignee: Caterpillar Tractor Co., Peoria, Ill.

[22] Filed: Mar. 11, 1974

[21] Appl. No.: 450,211

Related U.S. Application Data

[63] Continuation of Ser. No. 272,407, July 17, 1972, abandoned.

[52] U.S. Cl.................. 74/501; 74/512; 180/77 R
[51] Int. Cl. .............................................. F16c 1/10
[58] Field of Search ............. 74/469, 489, 491, 501, 74/502, 512; 180/77 R

[56] References Cited
UNITED STATES PATENTS

| | | | |
|---|---|---|---|
| 2,994,231 | 8/1961 | Gaylord | 74/501 |
| 3,313,174 | 4/1967 | Walker et al. | 74/474 |
| 3,402,792 | 9/1968 | Masser | 74/469 X |

Primary Examiner—Samuel Scott
Assistant Examiner—F. D. Shoemaker
Attorney, Agent, or Firm—Phillips, Moore, Weissenberger Lempio & Strabala

[57] ABSTRACT

There is disclosed a control lever and linkage system comprising a control lever operatively connected by means of a flexible wire to a remotely positioned control element. The control lever comprises a rotatable shaft mounted in the sidewall of an enclosed housing and having a first arm externally of the housing for manipulation by an operator and a second arm internally of the housing operatively connected to the end of the control wire. The opposite end of the control wire extends into a second remotely positioned housing and is therein connected to a control element to be actuated.

6 Claims, 4 Drawing Figures

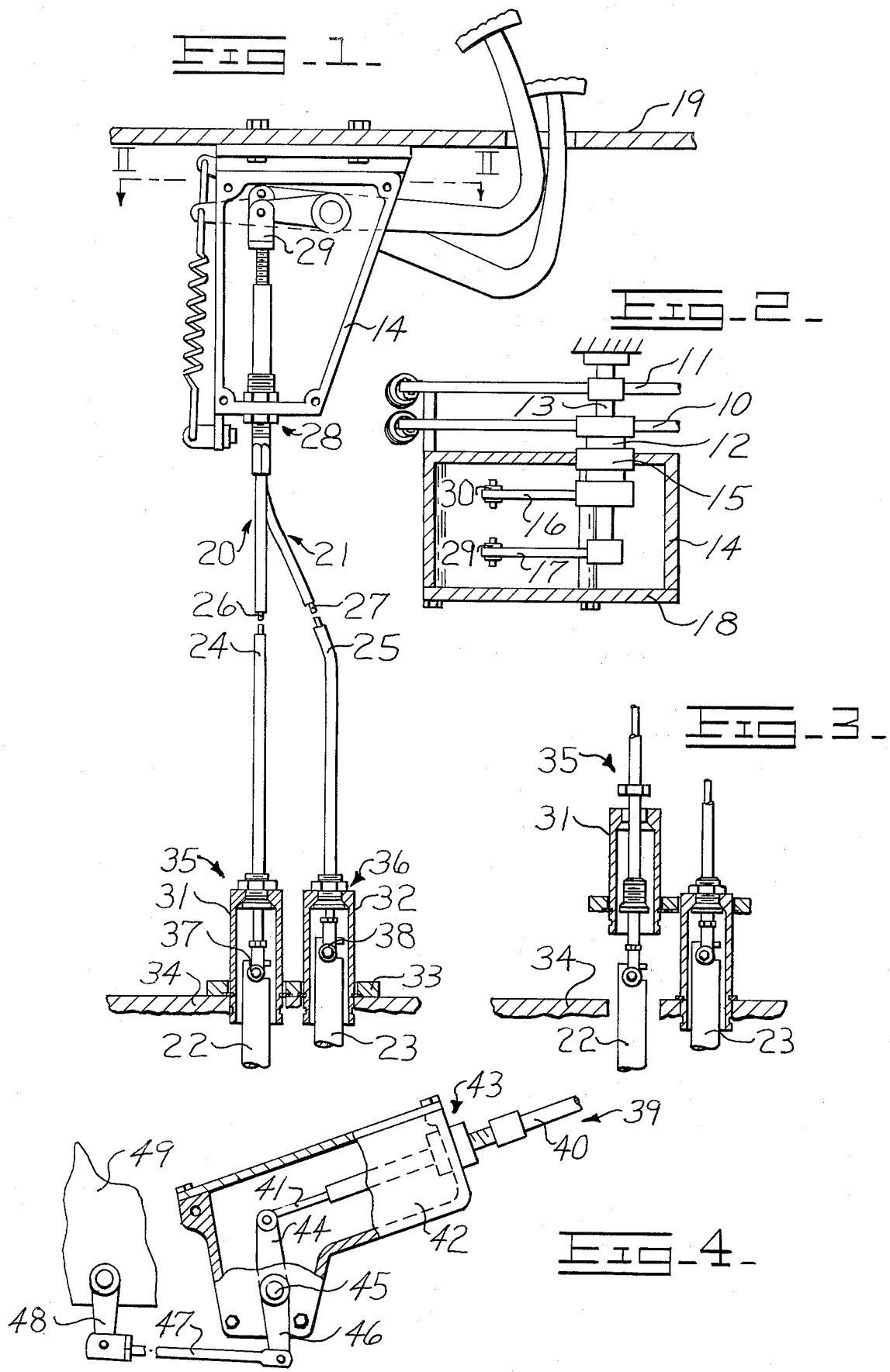

CONTROL LEVER AND LINKAGE SYSTEM

This is a continuation of application Ser. No. 272,407, filed July 17, 1972.

BACKGROUND OF THE INVENTION

The present invention relates to a control lever and linkage system and pertains more particularly to flexible wire control means having opposite ends sealingly enclosed within remotely positioned housings.

Flexible wire cables enclosed within flexible conduits or guides are quite commonly used for control systems for connecting a control lever for operator manipulation of a remotely positioned control element. Such control cables are quite commonly used for throttle and choke cables for control brakes, transmission controls and other similar control systems.

Such cable control systems are quite commonly used in motor vehicles and are quite satisfactory under normal or ordinary working conditions. However, attempts to use such control cables on earthworking and other off-the-road vehicles have resulted in substantial or quite common unsatisfactory performance due to jamming and binding of the cable itself within the elongted tubular guide member. Such jamming and sticking normally results from accumulations of dust, dirt and similar debris as the result of dusty environment in which the vehicle operates.

Some control systems such as throttle and governor control connections are particularly sensitive to these conditions. Even slight changes in the force required to move the control cable often results in unsatisfactory performances in some of these systems, particularly governor controls and throttle systems.

SUMMARY OF THE INVENTION

It is a primary object of the present invention to provide a control lever and linkage system that overcomes the above problems of the prior art.

Another object of the present invention is to provide a remote control lever and linkage system having means provided to prevent the jamming and locking of the cables as the result of dust and other adverse conditions.

A further object of the present invention is to provide a remote control cable system incorporating housing means for sealing the control cables against dust and similar debris and including lever means for transmitting the control motion through the housing.

In accordance with a primary aspect of the present invention, a remote control lever and cable linkage system is provided with housing means at both ends thereof with the cable sealingly extending into the housing and including rotary shaft and arms or levers for transmitting the control movement from the cable externally of the housing. This arrangement permits the use of reliable low friction rotary seals to seal the sliding cables against dust and other forms of contamination.

BRIEF DESCRIPTION OF THE DRAWINGS

The above and other objects and advantages of this invention will become apparent from the following specification when read in conjunction with the accompanying drawings, wherein:

FIG. 1 is a side elevational view of a control lever and linkage system incorporating the principles of the present invention;

FIG. 2 is a sectional view taken generally along lines II—II of FIG. 1;

FIG. 3 is an exploded view of a portion of the embodiment of FIG. 1; and

FIG. 4 is an alternate embodiment of the present invention.

DETAILED DESCRIPTION OF PREFERRED EMBODIMENTS

Referring now to the drawings and particularly to FIGS. 1 and 2, there is illustrated a control lever and linkage system comprising a pair of levers 10 and 11, which in this case are illustrated as having foot pedals, and which are both rotatably mounted in a suitable manner by means of respective shafts 12 and 13 in a sidewall of an enclosed housing 14. The shaft 12, in the illustrated example, is hollow and receives the second shaft 13 through the central bore thereof, shaft 12 being rotatably mounted in a suitable bore 15 of the wall 14. Each of the levers 10 and 11 includes internal arms, respectively 16 and 17, which are enclosed within the housing 14 by means of a cover 18. The housing 14 is suitably secured to the floorboard or fire wall 19 of a vehicle for manipulation by the operator from the operator compartment.

Each of the control levers 10 and 11 is connected respectively by means of elongated flexible wire cables 20 and 21 to remotely positioned movable control elements 22 and 23. The remote control elements 22 and 23 may be gear shift control members, brake control members, throttle control elements, or any other suitable control elements.

Each of the control cables 20 and 21, sometimes called push-pull cables, comprises an outer elongated flexible guide housing or conduit 24 and 25 and an internal elongated flexible wire 26 and 27. Each of the control cables extends through one wall of housing 14, and the conduit of each cable means is secured to the wall of housing 14 by suitable nut and screw arrangement 28. This secures that end of the conduit of the cable means stationary with respect to the housing 14. The internal cable or wire 26 is connected by suitable clevis arrangement 29 to lever 17 of control lever 11. A similar clevis member 30 connects control cable or wire 27 to arm 16 of lever 10. The opposite ends of the control cables are each respectively received and sealed within housing means 31 and 32 respectively, each of which is suitably attached by means of an adapter plate 33 to a housing 34.

The outer guide members 24 and 25 of each of the cables are similarly secured by means of suitable nut and screw type arrangements 35 and 36 to each of the respective housings 31 and 32 to retain the outer guide member or housing 24 and 25 respectively stationary with respect to each of the sealing housings. The internal control cables 26 and 27 are each respectively connected to the respective control elements 22 and 23 by suitable means such as clevises 37 and 38.

Each of the respective housings 31 and 32 may be removed from the housing 34 as shown in FIG. 3, simply by removing securing or adapter plate 33 and the attachment means 35 and 36, and pulling the housing plate away from the housing as is shown in FIG. 3 to expose the connection of the control cable with the control element. Thus, the end of the control cable may be conveniently removed or detached from the control element. Similarly, each end of the control cable is sealingly secured within a housing to prevent the accumulation of dust and other foreign material from working into each of the cables between the internal movable control element 26 and the external guide housing member 24.

A control cable 39, including an outer guide conduit or housing 40 and an inner slidable wire or cable 41, extends into a housing 42 with the outer guide member 40 suitably secured by means of a nut arrangement 43 to the housing 42. The housing 42 is enclosed by suitable removable cover means. The motion of the cable or control member 41 is transmitted by way of lever comprising a first arm 44 secured to a shaft 45 which is rotatably mounted in housing 42 and extends through the wall thereof, and having an arm 46 externally of the housing secured to the shaft 45. A suitable link member 47 then connects the arm 46 to the control member, such as for example, an arm 48 attached to an engine governor 49. Thus, with this arrangement, both ends of an elongated control cable are sealingly enclosed within a housing, and the motion transmitted thereto and therefrom by means of a lever which is pivotally connected to the housing by means of a rotary shaft extending through a wall thereof. Thus, with this arrangement, it is seen that the control cables 20, 21, 39 are completely sealed from atmospheric contaminants such as dust, dirt and other similar debris.

While this invention has been described with respect to preferred embodiments, it is to be understood that numerous changes and modifications may be made in the illustrated embodiments without departing from the spirit and scope of the present invention as defined in the appended claims.

What is claimed is:

1. A sealed control lever and linkage system comprising in combination:
   at least one manually manipulatable control lever;
   at least one remotely located movable control element;
   linkage means including an enclosed flexible cable comprising an outer guide sleeve and an inner flexible wire element slidably mounted within said sleeve for connecting said control lever to said remotely located control element;
   a first housing sealingly enclosing one end of said cable and one end of said control lever; said lever including a shaft rotatably journaled in one wall of said housing and having a first arm secured to said shaft externally of said housing for manual manipulation and a second arm secured to said shaft internally of said housing and detachably secured to one end of said flexible wire element; and
   a second housing sealingly enclosing the other end of said cable and the connection of said flexible wire element to said remotely located control element.

2. The control lever and linkage system of claim 1 wherein:
   said remotely located control element includes a lever for transferring motion of said flexible wire element to the outside of said second housing for connection to another control element, said lever comprising a shaft rotatably journaled in said second housing and having a first arm secured to one end of said shaft inside said housing and a second arm secured to the other end of said shaft outside said housing, so that the sole function of said second housing is for sealing said other end of said cable against dust and the like.

3. The control lever and linkage system of claim 1 including a sealed third housing, and wherein said second housing comprises a tubular member detachably secured to the end of said outer guide sleeve and telescopically received in a bore in said third housing and detachably secured thereto; and
   detachable connecting means for connecting said flexible wire to said remotely located control element within said tubular member so that said detachable connecting means is sealed against dust and the like within said second housing and is accessible for disconnecting when said second housing is detached and removed from said bore of said third housing.

4. The control system of claim 1 wherein said control element is a slidable element and the connection of the wire thereto is within a said second sealed housing.

5. The control system of claim 4 comprising a tubular member connecting said guide sleeve to said second housing supporting said control element.

6. The control system of claim 2 comprising a plurality of control levers, said levers including co-axially disposed rotatable shafts.

* * * * *